(12) United States Patent
Pridoehl et al.

(10) Patent No.: US 7,837,892 B2
(45) Date of Patent: Nov. 23, 2010

(54) RUBBER COMPOUND CONTAINING NANOSCALE, MAGNETIC FILLERS

(75) Inventors: Markus Pridoehl, Grosskrotzenburg (DE); Guido Zimmermann, Bruehl (DE); Joachim Froehlich, Bornheim (DE); Achim Gruber, Schoenau (DE); Gregor Grun, Weinheim (DE); Thomas Ruehle, Weinheim (DE); Dirk W. Schubert, Leutershausen (DE)

(73) Assignee: Evonik Degussa GmbH, Essen (DE)

( * ) Notice: Subject to any disclaimer, the term of this patent is extended or adjusted under 35 U.S.C. 154(b) by 706 days.

(21) Appl. No.: 11/574,254

(22) PCT Filed: Aug. 20, 2005

(86) PCT No.: PCT/EP2005/009019

§ 371 (c)(1),
(2), (4) Date: Aug. 27, 2007

(87) PCT Pub. No.: WO01/60639

PCT Pub. Date: Aug. 23, 2001

(65) Prior Publication Data

US 2008/0135799 A1    Jun. 12, 2008

(30) Foreign Application Priority Data

Aug. 28, 2004   (DE) .................... 10 2004 041 746

(51) Int. Cl.
*C08K 3/22* (2006.01)

(52) U.S. Cl. ............... 252/62.54; 252/62.53; 252/62.55; 252/62.56; 252/62.62; 252/62.63; 252/62.6; 252/62.64; 252/62.61; 252/62.57; 524/924; 524/435; 524/424; 524/847; 524/928; 524/929; 523/204; 523/215; 523/216; 523/212

(58) Field of Classification Search ............. 252/62.54, 252/62.53, 62.55, 62.56; 524/925, 435, 424, 524/847, 928, 929; 523/204, 215, 216, 212
See application file for complete search history.

(56) References Cited

U.S. PATENT DOCUMENTS

| 5,695,900 | A | 12/1997 | Selim | |
|---|---|---|---|---|
| 6,476,113 | B1 * | 11/2002 | Hiles | 524/439 |
| 6,511,784 | B1 * | 1/2003 | Hiller et al. | 430/270.1 |
| 6,746,767 | B2 | 6/2004 | Gottfried et al. | |

(Continued)

FOREIGN PATENT DOCUMENTS

EP       0 582 299       2/1994

(Continued)

OTHER PUBLICATIONS

U.S. Appl. No. 11/720,613, filed Jun. 1, 2007, Pridoehl, et al.

(Continued)

*Primary Examiner*—C. Melissa Koslow
(74) *Attorney, Agent, or Firm*—Oblon, Spivak, McClelland, Maier & Neustadt, L.L.P.

(57) ABSTRACT

Rubber compound containing at least one nanoscale, magnetic filler and at least one non-magnetic filler. Vulcanizable mixture containing the rubber compound and at least one crosslinking agent and/or vulcanization accelerator. Molding obtainable from the vulcanizable mixture by heat treatment or action of an electrical, magnetic or electromagnetic alternating field.

18 Claims, 1 Drawing Sheet

U.S. PATENT DOCUMENTS

| | | |
|---|---|---|
| 6,761,747 B2 | 7/2004 | Gottfried et al. |
| 7,235,298 B2 | 6/2007 | Katusic et al. |
| 7,371,337 B2 | 5/2008 | Katusic et al. |
| 2002/0183427 A1 | 12/2002 | Yamaguchi |
| 2004/0229036 A1* | 11/2004 | Gottfried et al. ............ 428/401 |
| 2004/0249037 A1 | 12/2004 | Kolbe et al. |
| 2006/0216441 A1 | 9/2006 | Schubel et al. |
| 2006/0281846 A1 | 12/2006 | Hager et al. |
| 2007/0094757 A1 | 4/2007 | Pridohl et al. |
| 2007/0149395 A1 | 6/2007 | Kroell et al. |
| 2007/0172406 A1 | 7/2007 | Pridoehl et al. |
| 2007/0172415 A1 | 7/2007 | Zimmermann et al. |
| 2007/0173581 A1 | 7/2007 | Hager et al. |
| 2007/0183918 A1 | 8/2007 | Monsheimer et al. |
| 2007/0199477 A1 | 8/2007 | Hill et al. |
| 2008/0161469 A1 | 7/2008 | Hoss et al. |

FOREIGN PATENT DOCUMENTS

| | | | |
|---|---|---|---|
| EP | 582299 | * | 2/1994 |
| JP | 2001-181451 | | 7/2001 |
| WO | 01/60639 | | 8/2001 |

OTHER PUBLICATIONS

U.S. Appl. No. 12/089,926, filed Jun. 4, 2008, Haeger, et al.
U.S. Appl. No. 09/044,797, filed Mar. 20, 1998, Brudny, et al.
U.S. Appl. No. 11/574,020, filed Feb. 21, 2007, Katusic, et al.
U.S. Appl. No. 12/089,809, filed Apr. 10, 2008, Goering, et al.
U.S. Appl. No. 11/822,862, filed Jul. 10, 2007, Hager, et al.
U.S. Appl. No. 12/279,276, filed Aug. 13, 2008, Roos, et al.

* cited by examiner

RUBBER COMPOUND CONTAINING NANOSCALE, MAGNETIC FILLERS

CROSS REFERENCE TO RELATED APPLICATION

This application is a 371 of PCT/EPO5/009019, filed on Aug. 20, 2005, and claims priority to German Patent Application No. 10 2004 041 746.6, filed on Aug. 28, 2004.

The invention relates to a rubber compound, which contains a nanoscale, magnetic filler, a vulcanisable mixture containing the rubber compound and a moulding thereof.

BACKGROUND OF THE INVENTION

It is known to use magnetite, a naturally occurring iron oxide of the formula $Fe_3O_4$, in rubber compounds (Kautschuk Gummi Kunststoffe 56 (2003), pages 322 to 329). It is possible in this way to vary the heating capacity and the magnetic properties of the rubber compound. The average size ($d_{50}$) of the magnetite particles used is in a range of approx. 10 to 60 µm. While it is true that their use enables the microwave heating capacity of the rubber compound to be increased, however, very high concentrations of magnetite are needed to achieve these effects. Even with these high concentrations, only a low heating rate results. Finally, the high concentration of magnetite leads to a disadvantageous change in the mechanical properties of the rubber compound.

From DE-A-10163399 a preparation is known in which superparamagnetic particles, containing at least one mixed metals oxide of the general formula M(II)M(III) $O_4$, are present in dispersed form in a coherent phase. As the coherent phase, polymerisable monomers suitable for adhesives can be used. DE-A-10163399 gives no indications of the use of vulcanisable polymers.

A disadvantage of the particles used is their reagglomeration tendency during the production of the preparation. This can result in these particles losing their superparamagnetic properties. Moreover, there is the risk of uneven distribution of the particles in the preparation. To avoid this, the particles in DE-A-10163399 are preferably used in surface-modified form.

BRIEF SUMMARY OF THE INVENTION

The object of the present invention is to provide a rubber compound with magnetic properties, which has a good heating capacity compared with the prior art and which does not disadvantageously modify the mechanical properties of the rubber compound.

The object of the invention is also to provide a vulcanisable mixture and mouldings which can be produced therefrom.

Figure 1:
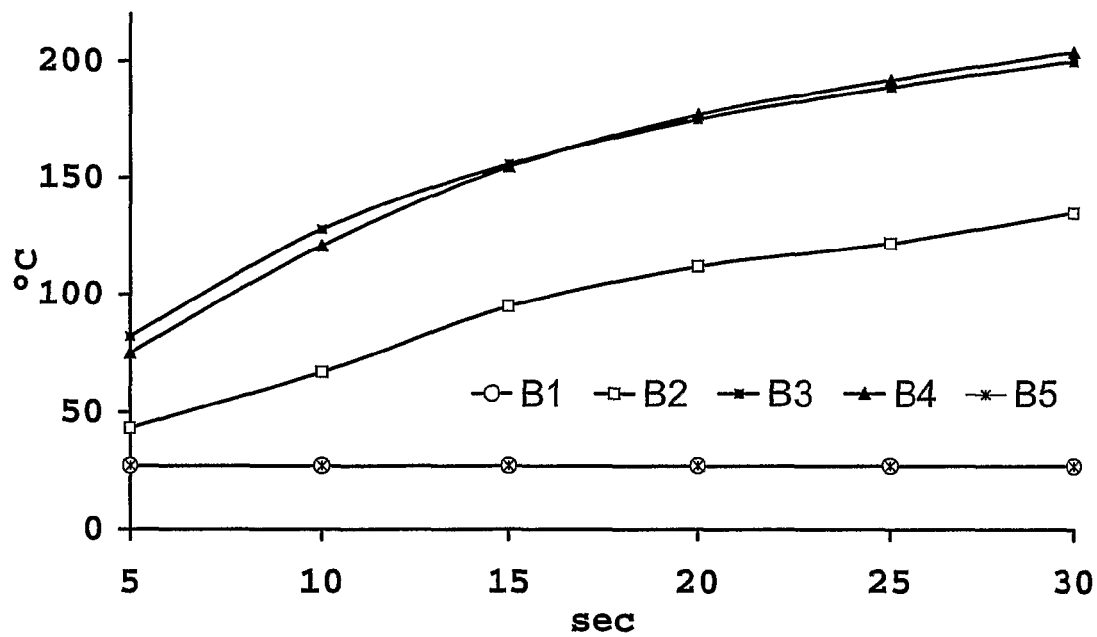
FIG. 1 shows the curve of temperature in ° C. as a function of the heating period in sec for samples B1-B5.

The invention provides a rubber compound containing at least one non-magnetic filler and at least one nanoscale, magnetic filler.

DETAILED DESCRIPTION OF THE INVENTION

Within the meaning of the invention, magnetic means ferro-, ferri-, para- or superparamagnetic. Nanoscale fillers are intended to mean those exhibiting a particle size of less than 250 nm in the rubber compound.

The nanoscale, magnetic fillers can preferably be present as magnetite and/or maghaemite. They can also be present as a mixed oxide of at least two metals with the metal components iron, cobalt, nickel, tin, zinc, cadmium, manganese, copper, barium, magnesium, lithium or yttrium.

The nanoscale, magnetic fillers can also be substances with the general formula $M^{II}Fe_2O_4$, wherein $M^{II}$ denotes a metal component comprising at least two different, divalent metals. One of the divalent metals can preferably be manganese, zinc, magnesium, cobalt, copper or nickel.

Furthermore, the nanoscale, magnetic fillers can be composed of ternary systems of the general formula $(M^a_{1-x-y} M^b_x Fe_y)^{II} Fe_2^{III} O_4$, wherein $M^a$ and $M^b$ can be the metals manganese, cobalt, nickel, zinc, copper, magnesium, barium, yttrium, tin, lithium, cadmium, calcium, strontium, titanium, chromium, vanadium, niobium, molybdenum, with x=0.05 to 0.95, y=0 to 0.95 and x+y≦1.

The following may be particularly preferred: $ZnFe_2O_4$, $MnFe_2O_4$, $Mn_{0.6}Fe_{0.4}Fe_2O_4$, $Mn_{0.5}Zn_{0.5}Fe_2O_4$, $Zn_{0.1}Fe_{1.9}O_4$, $Zn_{0.2}Fe_{1.8}O_4$, $Zn_{0.3}Fe_{1.7}O_4$, $Zn_{0.4}Fe_{1.6}O_4$ or $Mn_{0.39}Zn_{0.27}Fe_{2.34}O_4$.

The magnetic, nanoscale filler of the rubber compound according to the invention can advantageously consist of aggregates of a non-magnetic metal oxide matrix, in which nanoscale, magnetic metal oxide domains are present.

The term 'domains' means areas within the matrix separated from one another spatially. The average diameter of the nanoscale metal oxide domains is 3 to 100 nm.

The domains can be completely or only partly enclosed by the surrounding matrix. Partly enclosed means that individual domains protrude from the surface of an aggregate. The ratio, based on the weight, of domains to matrix is not limited, provided that domains, i.e. areas spatially separated from one another, are present.

The matrix-domain structure of the magnetic filler present in the rubber compound according to the invention prevents an agglomeration or an aggregation of the nanoscale, magnetic domains. As a result, the superparamagnetic behaviour, and thus an efficient heating capacity, are ensured. Good dispersibility results, with a homogeneous distribution of these particles in the rubber compound or in the vulcanisable mixture. It is known that nanoscale particles that are not embedded in a matrix can fuse to form larger aggregates.

As a result of the purely inorganic nature of the magnetic filler, the structure remains unchanged even in applications in which high temperatures occur.

The proportion of the metal oxide domains, based on the magnetic filler, has no upper limit, provided that domains are still present. These can preferably be powders with a ratio, based on the weight, of domains to matrix of 1:99 to 90:10.

The nanoscale, magnetic fillers of the rubber compound according to the invention are, as far as possible, pore-free and have free hydroxyl groups on the surface.

Aggregate, within the meaning of the invention, refers to three-dimensional structures of fused primary particles. Primary particles, within the meaning of the invention, are the particles formed primarily during the oxidation reaction in a flame. Several aggregates can bond together to form agglomerates.

The metal oxide matrix of the nanoscale, magnetic fillers is preferably an oxide of silicon, aluminium, cerium, titanium, zinc or zirconium. Silicon is particularly preferred.

The magnetic, nanoscale fillers can be produced according to EP-A-1284485 and the German patent application, application number 103 17 067.7 of 14.04.2003.

It may be advantageous if the nanoscale, magnetic fillers are present in a surface-modified form. As a result, interactions with other components of the rubber compound according to the invention, particularly rubber components, can be influenced. This can lead to improved mechanical properties of a vulcanised rubber compound.

Suitable surface-modified, magnetic particles are in particular those obtained by treatment with a halosilane, alkoxysilane, silazane and/or siloxane. Suitable substances for a surface modification are contained in DE-A-19500764.

Trimethoxyoctylsilane, hexamethyldisilazane, octamethylcyclotetrasiloxane, polydimethylsiloxane, octylsilane and/or hexamethyldisilazane can preferably be used for the surface modification of the nanoscale, magnetic fillers.

The surface modification can be carried out by spraying the nanoscale, magnetic filler with a surface-modifying reagent, which can optionally be dissolved in an organic solvent, such as e.g. ethanol, and then heat-treating the mixture at a temperature of 105 to 400° C. over a period of 1 to 6 h.

The rubber compound according to the invention can preferably contain as the rubber component natural rubber, polybutadiene, polyisoprene, fluororubber, styrene/butadiene copolymers, isobutylene/isoprene copolymers, halogenated isobutylene/isoprene copolymers, butadiene/acrylonitrile copolymers (NBR), partially hydrogenated or completely hydrogenated NBR (HNBR), partially hydrogenated or completely hydrogenated carboxylated NBR, ethylene/propylene/diene copolymers, ethylene/propylene copolymers, brominated isobutylene/paramethylstyrene copolymers, silicone rubber, such as liquid silicone rubber (LSR) and vinyl-methyl silicone rubber (VMQ), and mixtures thereof.

The rubber compound according to the invention also contains at least one non-magnetic filler. Preferred non-magnetic fillers can be silicon dioxide and/or carbon black.

The silicon dioxide powder can be present here as precipitated or pyrogenically produced silicon dioxide, optionally together with an organosilane. The organosilane reacts with the hydroxyl groups on the surface of the silicon dioxide powder. A silicon dioxide powder already surface-modified previously with the organosilane can also optionally be used.

The organosilanes used for the surface modification are the same as can be used for the surface modification of the nanoscale, magnetic fillers in the rubber compound according to the invention. The use of silicon dioxide powder in rubber compounds is known to the person skilled in the art and described e.g. in Ullmann's Encyclopedia, $5^{th}$ edition, vol. A 23, pages 395 to 397.

As carbon black it is possible to use furnace black, gas black, channel black, flame black, thermal black, acetylene black, plasma black, inversion carbon blacks, known from DE 195 21 565, Si-containing carbon blacks, known from WO 98/45361 or DE 196 13 796, or metal-containing carbon blacks, known from WO 98/42778, arc black and carbon blacks that are by-products of chemical production processes. The person skilled in the art will select these according to the intended application.

The proportion for each of the nanoscale, magnetic filler and the non-magnetic filler is preferably 0.1 to 80 wt. %, based on the total quantity of the rubber compound. A proportion of nanoscale, magnetic filler of 1 to 15 wt. %, based on the total quantity of the rubber compound, is particularly preferred.

The rubber compound according to the invention can contain other rubber auxiliaries, such as reaction accelerators, reaction inhibitors, antioxidants, stabilisers, processing auxiliaries, plasticisers, oils, waxes, metal oxides and activators, such as triethanolamine, polyethylene glycol, hexane triol, which are known to the rubber industry.

The rubber auxiliaries are used in conventional quantities, which depend on the intended application, among other things. Conventional quantities are e.g. quantities of 0.1 to 200 phr.

The rubber compound according to the invention can be obtained by mixing the rubbers with the nanoscale, magnetic fillers and the fillers, such as silicon dioxide and/or carbon black, rubber auxiliaries or organosilanes in conventional mixers, such as rollers, internal mixers and mixing extruders.

The rubber compound according to the invention is conventionally produced in internal mixers, wherein the rubber and the fillers are first incorporated in one or more consecutive, thermomechanical mixing steps, optionally together with organosilanes and the rubber auxiliaries, at 100 to 170° C. During this process, the sequence of addition and the time of addition of the individual components can have a decisive effect on the properties of the compound obtained and can therefore be varied according to the intended application. The process leads to a uniform distribution of the components of the rubber compound according to the invention, as far as possible.

The invention also provides a vulcanisable mixture, which contains the rubber compound according to the invention and at least one crosslinking agent and/or vulcanisation accelerator. Sulfur, organic sulfur donors or radical formers can be used as crosslinking agents. Examples of suitable vulcanisation accelerators are mercaptobenzo-thiazoles, sulfenamides, guanidines, thiurams, dithiocarbamates, thioureas, thiocarbonates or zinc oxide.

The vulcanisation accelerators and crosslinking agents can be used in quantities of 0.1 to 20 phr (parts per hundred rubber).

The vulcanisable mixture is obtained by adding the crosslinking agents and/or vulcanisation accelerators to the rubber compound according to the invention, generally in an internal mixture or on a roller, at 40-130° C. The vulcanisable mixture is processed for the subsequent process steps, such as e.g. shaping and vulcanisation.

The invention also provides a moulding, which is obtainable by
heat treatment and/or
action of an electrical, magnetic or an electromagnetic alternating field on the vulcanisable mixture according to the invention.

Heat treatment here means the thermal vulcanisation of the vulcanisable mixture according to the invention by introducing heat by means of heater assemblies.

To introduce energy into the vulcanisable mixture according to the invention more advantageously, magnetic and electromagnetic alternating fields are suitable.

In a particularly preferred embodiment, the nanoscale, magnetic fillers display superparamagnetic behaviour. When magnetic alternating fields are used, these can be heated particularly effectively.

When energy is introduced by means of a high-frequency, magnetic alternating field, the nanoscale, magnetic fillers contained in the vulcanisable mixture according to the invention enable the Curie temperature and the magnetic relaxation time of the nanoscale, magnetic fillers to be optimised at the same time. The Curie temperature is the maximum temperature to which a magnetic substance can be heated by the action of a magnetic or electromagnetic alternating field. By selection of the nanoscale, magnetic fillers, a particular Curie temperature can be set and thus excessive heating of the vulcanisable mixture according to the invention or of a moulding according to the invention can be avoided.

The frequency of suitable magnetic alternating fields is generally in a range of about 30 Hz to 100 MHz. Both frequencies in a range of about 100 Hz to 100 kHz and high frequencies in a range of 10 kHz to 60 MHz, particularly 50 kHz to 3 MHz, are suitable.

Furthermore, the vulcanisable mixture according to the invention can be exposed to an electromagnetic alternating field. This is preferably the electromagnetic alternating field of microwave radiation with a frequency in the range of about 0.3 to 300 GHz. At the same time, the vulcanisable mixture according to the invention can be exposed to a direct current magnetic field, the field strength of which can be in a range of 0.001 to 10 Tesla, for example.

The introduction of energy by means of an electrical, magnetic or electromagnetic alternating field can also, of course, take place in the moulding already produced by vulcanisation. Here again, the heating preferably takes place at the points where the nanoscale, magnetic fillers are located. By adjusting the Curie temperature or regulating the output, the maximum achievable temperature can be adjusted.

The invention also provides a moulding obtainable from the vulcanisable mixture according to the invention by heat treatment with the simultaneous action of a static magnetic field. This leads either to a moulding in which the nanoscale, magnetic fillers are no longer uniformly distributed in the moulding but, depending on the selection of the reaction conditions, are concentrated at certain points.

This moulding has the advantage that, when an electrical, magnetic or electromagnetic alternating field acts on the moulding, heating occurs preferentially where the nanoscale, magnetic filler particles are located. Thus, for example, it is possible not to heat temperature-sensitive parts of a moulding.

Alternatively, this leads to mouldings which experience mechanical pre-stress along the magnetic field lines, so that mouldings with anisotropic (e.g. mechanical, thermal, magnetic) properties result.

EXAMPLES

Production of the Nanoscale, Magnetic Fillers

Example A1

0.57 kg/h $SiCl_4$ are evaporated at approx. 200° C. and fed into a mixing zone with 4.1 $Nm^3$/h hydrogen and 11 $Nm^3$/h air. In addition, an aerosol, obtained from a 25 wt. % aqueous iron(III)chloride solution (1.27 kg/h), is introduced into the mixing zone within the burner by means of a carrier gas (3 $Nm^3$/h nitrogen). The homogeneously mixed gas-aerosol mixture burns there at an adiabatic combustion temperature of about 1200° C. with a residence time of about 50 msec. After the flame hydrolysis, the reaction gases and the resulting magnetic filler are cooled and separated from the waste gas stream by means of a filter in a known manner. In a further step, any hydrochloric acid residues still adhering are removed from the magnetic filler by treating with steam-containing nitrogen.

The nanoscale, magnetic filler has the following physico-chemical values: BET surface area 43 $m^2$/g, silicon dioxide content 50 wt. %, iron oxide content 50 wt. %, saturation magnetisation 29.7 $Am^2$/kg, Curie temperature approx. 620° C.

Example A2

0.17 kg/h $SiCl_4$ are evaporated at approx. 200° C. and fed into a mixing zone with 4.8 $Nm^3$/h hydrogen and 12.5 $Nm^3$/h air. In addition, an aerosol, obtained from a 25 wt. % aqueous iron(III)chloride solution (2.16 kg/h), is introduced into the mixing zone within the burner by means of a carrier gas (3 $Nm^3$/h nitrogen). The homogeneously mixed gas-aerosol mixture burns there at an adiabatic combustion temperature of about 1200° C. with a residence time of about 50 msec. After the flame hydrolysis, the reaction gases and the resulting magnetic filler are cooled and separated from the waste gas stream by means of a filter in a known manner. In a further step, any hydrochloric acid residues still adhering are removed from the magnetic filler by treating with steam-containing nitrogen.

The nanoscale, magnetic filler has the following physico-chemical values: BET surface area 44 $m^2$/g, silicon dioxide content 15 wt. %, iron oxide content 85 wt. %, saturation magnetisation 54.2 $Am^2$/kg, Curie temperature 620° C.

Production of the Rubber Compounds

Examples B

Rubber Compound Containing Nanoscale Magnetic Filler, EPDM and Carbon Black

| Step 1 | |
| --- | --- |
| Mixer | Brabender 350S |
| Speed | 80/min |
| Ram pressure | 5 bar |
| Empty volume | 0.39 litres |
| Fill level | 0.68 |
| Throughput temperature | 80° C. |
| Mixing operation | |
| 0 min-1 min | All components of 1st step |
| 1 min | Clean |
| 1 min-3.5 min | Mix |
| 3.5 min | Discharge |
| Batch temperature | 135° C.-145° C. |
| Storage | 4 hours at room temperature |
| Step 2 | |
| Mixer | Brabender 350S |
| Speed | 50/min |
| Ram pressure | 5 bar |
| Empty volume | 0.39 litres |
| Fill level | 0.66 |
| Throughput temperature | 50° C. |
| Mixing operation | |
| 0 min | Add 1st step batch, accelerator and crosslinking chemicals |
| 0 min-2.5 min | Mix |
| 2.5 min | Discharge and form sheet using laboratory mixing rolls: Homogenising: Cut 3 times on the left, 3 times on the right and pass 8 times through a narrow roll nip (1 mm) and 3 times through a wide roll nip (3.5 mm) Sheet out |
| Batch temperature | 95° C.-105° C. |

Examples C

Rubber Compound Containing Nanoscale Magnetic Filler, EPDM and Silica

Step 1

| | |
|---|---|
| Mixer | Brabender 350S |
| Speed | 100/min |
| Ram pressure | 5 bar |
| Empty volume | 0.39 litres |
| Fill level | 0.68 |
| Throughput temperature | 95° C. |
| Mixing operation | |
| 0 min | Add all components of step 1 |
| 0 min-3 min | Mix |
| 3 min | Clean |
| 3 min-4.5 min | Mix |
| 4.5 min | Discharge |
| Batch temperature | 135° C.-145° C. |
| Storage | 4 hours at room temperature |

Step 2

| | |
|---|---|
| Mixer | Brabender 350S |
| Speed | 70/min |
| Ram pressure | 5 bar |
| Empty volume | 0.39 litres |
| Fill level | 0.66 |
| Throughput temperature | 60° C. |
| Mixing operation | |
| 0 min | Add 1st step batch + $2^{nd}$ step substances |
| 0 min-2 min | Mix |
| 2 min | Discharge and form sheet using laboratory mixing rolls: Homogenising: Cut 3 times on the left, 3 times on the right and pass 8 times through a narrow roll nip (1 mm) and 3 times through a wide roll nip (3.5 mm) Sheet out |
| Batch temperature | 95° C.-105° C. |

Examples D

Rubber Compound Containing Nanoscale or Microscale Magnetic Filler, EPDM and Silicon Dioxide Step 1

| | |
|---|---|
| Mixer | Brabender 350S |
| Speed | 100/min |
| Ram pressure | 5 bar |
| Empty volume | 0.39 litre |
| Fill level | 0.68 |
| Throughput temperature | 95 |
| Mixing operation | |
| 0 min | Add all components of $1^{st}$ step |
| 0 min-3 min | Mix |
| 3 min | Clean |
| 3 min-4.5 min | Mix |
| 4.5 min | Discharge |
| Batch temperature | 135° C.-145° C. |
| Storage | 4 hours at room temperature |

Step 2

| | |
|---|---|
| Mixer | Brabender 350S |
| Speed | 70/min |
| Ram pressure | 5 bar |
| Empty volume | 0.39 litre |
| Fill level | 0.66 |
| Throughput temperature | 60° C. |
| Mixing operation | |
| 0 min | Add batch of $1^{st}$ step, accelerators and crosslinking chemicals |
| 0 min-2 min | Mix |
| 2 min | Discharge and form sheet using laboratory mixing roller: Homogenising: Cut 3 times on the left, 3 times on the right and pass 8 times through a narrow roll nip (1 mm) and 3 times through a wide roll nip (3.5 mm) Sheet out |
| Batch temperature | 95° C.-105° C. |

Examples E

Rubber Compound Containing Nanoscale or Microscale Magnetic Filler, EPDM and Carbon Black Step 1

| | |
|---|---|
| Mixer | Brabender 350S |
| Speed | 80/min |
| Ram pressure | 5 bar |
| Empty volume | 0.39 litre |
| Fill level | 0.68 |
| Throughput temperature | 80° C. |
| Mixing operation | |
| 0 min-1 min | Add all components of $1^{st}$ step |
| 1 min | Clean |
| 1 min-3.5 min | Mix |
| 3.5 min | Discharge |
| Batch temperature | 135° C.-145° C. |
| Storage | 4 hours at room temperature |

Step 2

| | |
|---|---|
| Mixer | Brabender 350S |
| Speed | 50/min |
| Ram pressure | 5 bar |
| Empty volume | 0.39 litre |
| Fill level | 0.66 |
| Throughput temperature | 50° C. |
| Mixing operation | |
| 0 min | Add batch of $1^{st}$ step, accelerators and crosslinking chemicals |
| 0 min-2.5 min | Mix |
| 2.5 min | Discharge and form sheet using laboratory mixing roller: Homogenising: Cut 3 times on the left, 3 times on the right and pass 8 times through a narrow roll nip (1 mm) and 3 times through a wide roll nip (3.5 mm) Sheet out |
| Batch temperature | 95° C.-105° C. |

Examples F

Tire Compound ("Green Tire") Containing Nanoscale or Microscale Magnetic Filler

Step 1

| | |
|---|---|
| Mixer | Internal mixer GK1.5E, Werner&Pfleiderer |
| Speed | 70/min |
| Ram pressure | 5.5 bar |
| Empty volume | 1.58 litre |
| Fill level | 0.56 |
| Throughput temperature | 80° C. |
| Mixing operation | |
| 0 min-1 min | Polymers |
| 1 min-2 min | $1^{st}$ half Ultrasil 7000; Edenor, ZnO, oil, silane; magnetic filler - depending on formulation |
| 2 min-4 min | $2^{nd}$ half Ultrasil 7000; anti-ageing agent |
| 4 min | Clean |
| 4 min-5 min | Mix |
| 5 min | Aerate |
| 5 min-6 min | Mix and discharge |
| Batch temperature | 140° C.-150° C. |
| Storage | 24 hours at room temperature |

Step 2

| | |
|---|---|
| Mixer | Internal mixer GK1.5E, Werner&Pfleiderer |
| Speed | 70/min |
| Ram pressure | 5.5 bar |
| Empty volume | 1.58 Litre |
| Fill level | 0.54 |
| Throughput temperature | 90° C. |
| Mixing operation | |
| 0 min-2 min | Plasticise batch of $1^{st}$ step |
| 2 min-5 min | Pinch at 145° C. batch temperature |
| 5 min | discharge |
| Batch temperature | 140° C.-150° C. |
| Storage | 4 hours at room temperature |

Step 3

| | |
|---|---|
| Mixer | Internal mixer GK1.5E, Werner&Pfleiderer |
| Speed | 50/min |
| Ram pressure | 5.5 bar |
| Empty volume | 1.58 litre |
| Fill level | 0.52 |
| Throughput temperature | 50° C. |
| Mixing operation | |
| 0 min | Add batch of $2^{nd}$ step, accelerators and crosslinking chemicals |
| 0 min-2 min | Mix |
| 2 min | Discharge and form sheet using laboratory mixing rolls: Homogenising: Cut 3 times on the left, 3 times on the right and pass 8 times through a narrow roll nip and 3 times through a wide roll nip Sheet out |
| Batch temperature | 100° C.-110° C. |

Examples B

Rubber Compound Containing Nanoscale Magnetic Filler, EPDM and Carbon Black

| | | Example | | | | |
|---|---|---|---|---|---|---|
| | | B1 | B2 | B3 | B4 | B5 |
| Step 1 | | | | | | |
| EPDM Keltan ® 8340 A | phr[§] | 60 | 60 | 60 | 60 | 60 |
| EPDM Keltan ® 578 | phr | 40 | 40 | 40 | 40 | 40 |
| Carbon black Corax ® N 550 | phr | 40 | 40 | 40 | 40 | 80 |
| Carbon black Corax ® N 990 | phr | 80 | 80 | 80 | 80 | 40 |
| ZnO RS RAL 844 C | phr | 3 | 3 | 3 | 3 | 3 |
| Edenor ST1 GS | phr | 1.5 | 1.5 | 1.5 | 1.5 | 1.5 |
| Sunpar 150 | phr | 60 | 60 | 60 | 60 | 60 |
| Filler from Example A1 | phr | 0 | 5.85 | 14.55 | 0 | 0 |
| | wt. %[*] | 0 | 1.98 | 4.78 | 0 | 0 |
| Filler from Example A2 | phr | 0 | 0 | 0 | 8.55 | 0 |
| | wt. %[*] | 0 | 0 | 0 | 2.86 | 0 |
| Step 2 | | | | | | |
| Total step 1 | phr | 284.5 | 290.35 | 299.05 | 293.05 | 284.5 |
| Rhenogran ® TMTD-80 | phr | 1.25 | 1.25 | 1.25 | 1.25 | 1.25 |
| Rhenogran S-80 | phr | 0.38 | 0.38 | 0.38 | 0.38 | 0.38 |
| Rhenogran ® ZDMC-80 | phr | 1.88 | 1.88 | 1.88 | 1.88 | 1.88 |
| Rhenogran ® ZDBC-80 | phr | 1.88 | 1.88 | 1.88 | 1.88 | 1.88 |

Keltan ®: DSM;
Corax ®: Degussa;
Edenor: Caldic Deutschland;;
Sunpar: Sun Oil Company;
Rhenogran ®: Rheinchemie;
[§]phr: parts per hundred rubber;
[*]based on the total accelerated rubber compound

Examples C

Rubber Compound Containing Nanoscale Magnetic Filler, EPDM and Silicon Dioxide

|  |  | Example | | | |
| --- | --- | --- | --- | --- | --- |
|  |  | C1 | C2 | C3 | C4 |
| Step 1 | | | | | |
| EPDM Keltan ® 2340-A | phr | 100 | 100 | 100 | 100 |
| Precipitated silica Ultrasil ® VN 2 GR | phr | 50 | 50 | 50 | 50 |
| ZnO RS RAL 844 C | phr | 3 | 3 | 3 | 3 |
| Edenor ST1 GS (stearic acid) | phr | 1 | 1 | 1 | 1 |
| TESPT Si69 ® | phr | 3 | 3 | 3 | 3 |
| Sunpar 150 ® | phr | 30 | 30 | 30 | 30 |
| Filler from Example A1 | phr | 0 | 3.9 | 9.7 | 0 |
|  | wt. %(*) |  | 1.97 | 4.77 |  |
| Filler from Example A2 | phr | 0 | 0 | 0 | 5.7 |
|  | wt. %(*) |  |  |  | 2.86 |
| Step 2 | | | | | |
| Total step 1 | phr | 187 | 190.9 | 196.7 | 192.7 |
| MBT Vulkacit ® mercapto/MGC | phr | 1 | 1 | 1 | 1 |
| TMTD Vulkacit ® thiuram/C | phr | 1 | 1 | 1 | 1 |
| Sulfur | phr | 1.3 | 1.3 | 1.3 | 1.3 |
| Zn-dialkyldithiophosphate Rhenocure ® TP/G | phr | 3.5 | 3.5 | 3.5 | 3.5 |

Ultrasil: Degussa;
TESPT Si69 ® Degussa;
Vulkacit ®: Bayer;
Rhenocure ®: Rheinchemie
(*)based on the total accelerated rubber compound

Examples D

Rubber Compound Containing Nanoscale or Microscale Magnetic Filler, EPDM and Silicon Dioxide

|  |  | Example | | |
| --- | --- | --- | --- | --- |
|  |  | D1 | D2 | D3 |
| Step 1 | | | | |
| EPDM Keltan ® 2340-A | phr | 100 | 100 | 100 |
| precipitated silica Ultrasil ® VN 2 GR | phr | 50 | 50 | 50 |
| ZnO RS RAL 844 C | phr | 3 | 3 | 3 |
| Edenor ST1 GS (stearic acid) | phr | 1 | 1 | 1 |
| TESPT Si69 ® | phr | 3 | 3 | 3 |
| Sunpar 150 ® | phr | 30 | 30 | 30 |
| Filler from Example A2 | phr | 0 | 5.7 | 0 |
|  | wt. %(*) |  | 2.86 |  |
| Filler MagniF 10 | phr | 0 | 0 | 5.7 |
|  | wt. %(*) |  |  | 2.86 |
| Step 2 | | | | |
| Total step 1 | phr | 187 | 192.7 | 192.7 |
| MBT Vulkacit ® Merkapto/MGC | phr | 1 | 1 | 1 |
| TMTD Vulkacit ® Thiuram/C | phr | 1 | 1 | 1 |
| Sulfur | phr | 1.3 | 1.3 | 1.3 |
| Zn dialkyl dithiophosphate Rhenocure ® TP/G | phr | 3.5 | 3.5 | 3.5 |

Magnetite, Magni F10, Fa. Minelco

Examples E

Rubber Compound Containing Nanoscale or Microscale Magnetic Filler, EPDM and Carbon Black

|  |  | Example | | |
| --- | --- | --- | --- | --- |
|  |  | E1 | E2 | E3 |
| Step 1 | | | | |
| EPDM Keltan ® 8340 A | phr(§) | 60 | 60 | 60 |
| EPDM Keltan ® 578 | phr | 40 | 40 | 40 |
| Carbon black Corax ® N 550 | phr | 40 | 40 | 40 |
| Carbon black Corax ® N 990 | phr | 80 | 80 | 80 |
| ZnO RS RAL 844 C | phr | 3 | 3 | 3 |
| Edenor ST1 GS | phr | 1.5 | 1.5 | 1.5 |
| Sunpar 150 | phr | 60 | 60 | 60 |
| Filler from Example A2 | phr | 0 | 8.55 | 0 |
|  | wt. %(*) | 0 | 2.86 | 0 |
| Filler MagniF 10 | phr | 0 | 0 | 8.55 |
|  | wt. %(*) | 0 | 0 | 2.86 |
| Step 2 | | | | |
| Total step 1 | phr | 284.5 | 293.05 | 293.05 |
| Rhenogran ® TMTD-80 | phr | 1.25 | 1.25 | 1.25 |
| Rhenogran S-80 | phr | 0.38 | 0.38 | 0.38 |
| Rhenogran ® ZDMC-80 | phr | 1.88 | 1.88 | 1.88 |
| Rhenogran ® ZDBC-80 | phr | 1.88 | 1.88 | 1.88 |

Examples F

Tire Compound ("Green Tire") Containing Nanoscale or Microscale Magnetic Filler

|  |  | Example | | |
| --- | --- | --- | --- | --- |
|  |  | F1 | F2 | F3 |
| Step 1 | | | | |
| BUNA VSL 5025-1 | phr | 96 | 96 | 96 |
| BUNA CAN BE 24 | phr | 30 | 30 | 30 |
| Precipitated silica Ultrasil ® 7000 GR | phr | 80 | 80 | 80 |
| TESPT Si69 ® | phr | 6.4 | 6.4 | 6.4 |
| ZnO RS RAL 844 C | phr | 3 | 3 | 3 |
| Filler from Example A2 | phr | 0 | 6.91 | 0 |
|  | wt. %(*) |  | 2.86 |  |
| Filler MagniF 10 | phr | 0 | 0 | 6.91 |
|  | wt. %(*) |  |  | 2.86 |
| Edenor ST1 GS (stearic acid) | phr | 2 | 2 | 2 |
| Naftolen ZD | phr | 10 | 10 | 10 |
| Vulkanox 4020 | phr | 1.5 | 1.5 | 1.5 |
| Protektor G 3108 | phr | 1 | 1 | 1 |
| Step 2 | phr | 229.9 | 236.81 | 236.81 |
| Step 3 | phr | 229.9 | 236.81 | 236.81 |
| Vulkacit ® D (DPG) | phr | 2 | 2 | 2 |
| Vulkacit ® CZ/EG-C (CBS) | phr | 1.5 | 1.5 | 1.5 |
| Perkacit TBZTD-C | phr | 0.2 | 0.2 | 0.2 |
| Sulfur | phr | 1.5 | 1.5 | 1.5 |

VSL 5025-1: SBR copolymer polymerised in solution, containing 37.5 phr oil;
Buna CB24: cis 1,4-polybutadiene (neodymium type);
Vulkanox 4020: 6PPD, all from Bayer AG;
Naftolen ZD: aromatic oil, Chemetall; Ultrasil 7000: Degussa AG;
Protektor G3108: wax from Paramelt B. V.;
Perkacit: Flexsys Examples B and C The samples B1-B5 and C1-C4, in the form of plates with the dimensions 30×8×8 mm or sheets with the dimensions 30×8×1 mm, were exposed to a high-frequency field of 350 kHz at a power of 55 kW.

Figure 2:
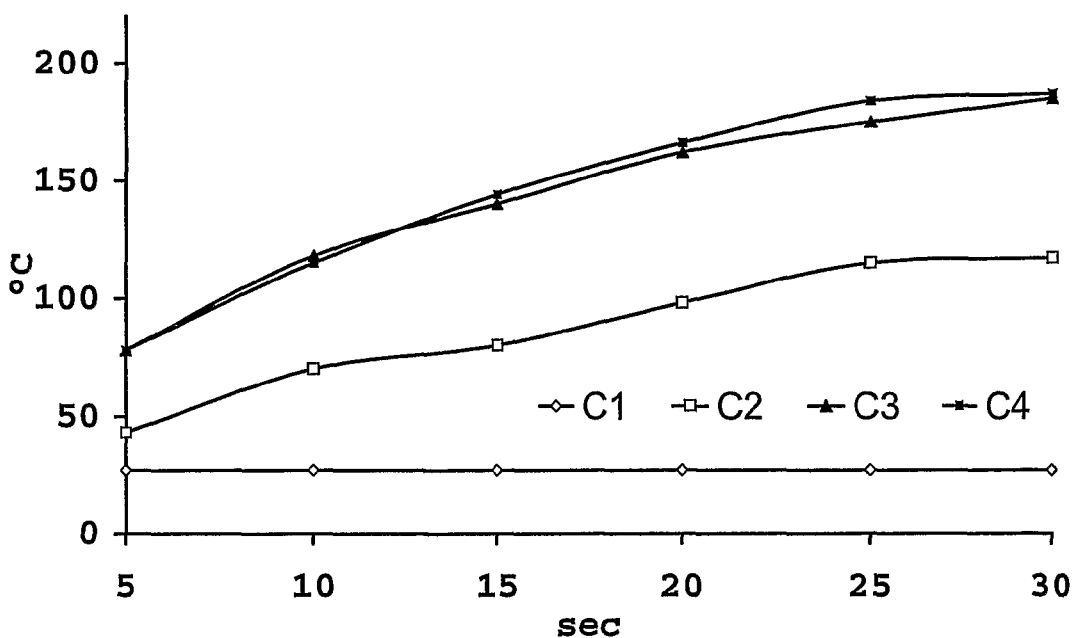
FIG. 2 shows the curve of temperature in ° C. as a function of the heating period in sec for samples C1-C4.

The heating performance was determined as a function of the heating period. In FIG. 1 and FIG. 2, the temperature in ° C. is shown as a function of the heating period in sec.

It is noted that the samples containing nanoscale, magnetic fillers (B2-B4 and C2-C4) are heated rapidly in the high-frequency field, while the comparative samples B1, B5 and C1 do not undergo any heating.

Furthermore, it can be noted that the quantity of nanoscale, magnetic filler in the sample is very small at no more than approx. 5 wt. %.

Examples B4 and C4 show the influence of the content of the domains in a nanoscale, magnetic filler with a matrix-domain structure.

Thus, B4 (C4) shows similar heating characteristics compared with B3 (C3). The proportion of nanoscale, magnetic domains in the filler of Example A2 is approx. 80 wt. %, and in the filler of Example A1 only 50 wt. %. Accordingly, the quantity of nanoscale filler can be reduced to achieve similar heating characteristics. The absolute quantity of nanoscale, magnetic domains in a filler with a matrix-domain structure is decisive. Thus, when nanoscale, magnetic fillers with a matrix-domain structure are used, it is possible to adjust the heating rate both via the content of filler itself and the content of the magnetic domains within the filler.

Examples D, E and F

Test procedure: The samples are placed inside an inductor coil. For this purpose samples of dimensions 18×20×6 mm³ were prepared and placed on cork in order to keep thermal losses as low as possible. The temperature was measured with an infrared sensor, which was placed at a distance of 5 cm from the coil. The infrared sensor (type: AMR FR 260 MV; manufacturer: Ahlborn) was mounted above the coil. The emission level adjusted by the manufacturer is 0.95. The measurement spot diameter at a distance of 5 cm is 14 mm. The accuracy of the infrared sensor is +/−2% and +/−2° C.; the in each case larger value applies at an ambient temperature of 23° C.

The inductor coil has the following specifications:

Dimensions: 200×45×40 mm³ (L×B×H)

Material: copper tubing, square 10×6×1 mm

Output cross-sectional area: 28 mm²

Coil feed length: 120 mm

Number of coil windings: 3

Coil winding length (eff.): 35 mm

Coil diameter (internal): 20 mm to 40 mm

Coil inner surface area: 720 mm²

Inductivity (at 100 kHz): ca. 270 nH

Operating frequency: 323 kHz

The high-frequency semiconductor generator used has the following specifications:

Manufacturer: STS—Systemtechnik Skorna GmbH

Type identification: STS Type M260S

Terminal output: 6 kW

Inductivity range: 250-1200 nH

Operating frequency: 150-400 kHz (323 kHz with the inductor coil that is used)

Results

Examples D

The heating up from room temperature (23° C.) with the magnetic field switched on and for a duration of in each case 27 seconds is measured:
- Rubber compound 1 (no magnetic filler), no measurable heating.
- Rubber compound 2 (mixture according to the invention with nanoscale magnetic filler); heating to 170° C. observed.
- Rubber compound 3 (comparison rubber compound with non-nanoscale magnetic filler MagniF 10); heating to only 88° C. observed.

Examples E

The heating up from room temperature (23° C.) with the magnetic field switched on and for a duration of in each case 28 seconds is measured:
- Rubber compound 1 (no magnetic filler), no measurable heating.
- Rubber compound 2 (mixture according to the invention with nanoscale magnetic filler); heating to 170° C. observed.
- Rubber compound 3 (comparison rubber compound with non-nanoscale magnetic filler MagniF 10); heating to only 78° C. observed.

Examples F

The heating up from room temperature (23° C.) with the magnetic field switched on and for a duration of in each case 24 seconds is measured:
- Rubber compound 1 (no magnetic filler), no measurable heating.
- Rubber compound 2 (mixture according to the invention with nanoscale magnetic filler); heating to 170° C. observed.
- Rubber compound 3 (comparison rubber compound with non-nanoscale magnetic filler MagniF 10); heating to only 70° C. observed.

The examples show that:
Rubber compounds can be inductively heated only by adding magnetic fillers, irrespective of the rubber system or reinforcing filler system that is used. Rubber compounds according to the invention that contain a nanoscale magnetic filler can under otherwise identical conditions in principle heat up substantially more rapidly than rubber compounds that do not contain such a filler.

The invention claimed is:

1. A rubber compound comprising at least one non-magnetic filler and at least one nanoscale, magnetic filler, which is in the form of aggregates of non-magnetic metal oxide matrices having nanoscale, magnetic metal oxide domains.

2. The rubber compound according to claim 1, wherein said nanoscale magnetic filler is magnetite, maghaemite, or both.

3. The rubber compound according to claim 1, wherein said nanoscale, magnetic filler is a mixed oxide of at least two metals with the metal components iron, cobalt, nickel, tin, zinc, manganese, copper, barium, magnesium, lithium or yttrium.

4. The rubber compound according to claim 3, wherein said nanoscale, magnetic filler is represented by the general formula $M^{II}Fe_2O_4$, where $M^{II}$ denotes a metal component comprising at least two different, divalent metals.

5. The rubber compound according to claim 1, wherein said metal oxide matrix consists of silicon dioxide, aluminium oxide, cerium oxide, titanium dioxide, zinc oxide or zirconium oxide.

6. The rubber compound according to claim 1, wherein said magnetic filler is surface-modified.

7. The rubber compound according to claim 1, wherein said rubber is selected from the group comprising natural rubber, polybutadiene, polyisoprene, fluororubber, styrene/butadiene copolymers, isobutylene/isoprene copolymers, halogenated isobutylene/isoprene copolymers, butadiene/acrylonitrile copolymers (NBR), partially hydrogenated or completely hydrogenated NBR (HNBR), partially hydrogenated or completely hydrogenated carboxylated NBR, ethylene/propylene/diene copolymers, ethylene/propylene copolymers, brominated isobutylene/paramethylstyrene copolymers, LSR and VMQ silicone rubbers, and mixtures thereof.

8. The rubber compound according to claim 1, wherein said non-magnetic filler is silicon dioxide, optionally together with an organosilane, carbon black, or both.

9. The rubber compound according to claim 1, wherein the proportion of each of said nanoscale, magnetic filler and non-magnetic filler is 0.1 to 80 wt. %, based on the total quantity of the rubber compound.

10. The rubber compound according to claim 1, further comprising rubber auxiliaries.

11. A vulcanizable mixture, comprising the rubber compound according to claim 1 in the presence of at least one crosslinking agent, vulcanization accelerator, or both.

12. A molding prepared from the vulcanizable mixture according to claim 11 by
heat treatment and/or
action of an electrical, magnetic or electromagnetic alternating field.

13. The rubber compound according to claim 1, wherein said at least one nanoscale, magnetic filler has a particle size of less than 250 nm in the rubber compound.

14. The rubber compound according to claim 4, wherein one of said divalent metals is manganese, zinc, magnesium, cobalt, copper or nickel.

15. The rubber compound according to claim 1, wherein said nanoscale, magnetic filler is a ternary system represented by $(M^a_{1-x-y}M^b_x Fe_y)^{II} Fe_2^{III} O_4$
wherein each of $M^a$ and $M^b$ is selected from the group consisting of manganese, cobalt, nickel, zinc, copper, magnesium, barium, yttrium, tin, lithium, cadmium, calcium, strontium, titanium, chromium, vanadium, niobium, and molybdenum, with
$x=0.05$ to $0.95$,
$y=0$ to $0.95$ and
$x+y \leq 1$.

16. The rubber compound according to claim 15, wherein said nanoscale, magnetic filler is $ZnFe_2O_4$, $MnFe_2O_4$, $Mn_{0.6}Fe_{0.4}Fe_2O_4$, $Mn_{0.5}Zn_{0.5}Fe_2O_4$, $Zn_{0.1}Fe_{1.9}O_4$, $Zn_{0.2}Fe_{1.8}O_4$, $Zn_{0.3}Fe_{1.7}O_4$, $Zn_{0.4}Fe_{1.6}O_4$ or $Mn_{0.39}Zn_{0.27}Fe_{2.34}O_4$.

17. The rubber compound according to claim 1, wherein said nanoscale, magnetic metal oxide domains have an average diameter of from 3 to 100 nm.

18. The rubber compound according to claim 1, wherein a ratio, based on the weight, of said nanoscale, magnetic metal oxide domains to said non-magnetic metal oxide matrices, each in the form of powder, is from 1:99 to 90:10.

* * * * *

UNITED STATES PATENT AND TRADEMARK OFFICE
CERTIFICATE OF CORRECTION

PATENT NO. : 7,837,892 B2
APPLICATION NO. : 11/574254
DATED : November 23, 2010
INVENTOR(S) : Markus Pridoehl et al.

It is certified that error appears in the above-identified patent and that said Letters Patent is hereby corrected as shown below:

On the title page, Item (87) should read:

-- (87) PCT Pub. No.: WO2006/024413
PCT Pub. Date: Mar. 9, 2006 --

Signed and Sealed this
Twenty-fifth Day of January, 2011

David J. Kappos
*Director of the United States Patent and Trademark Office*